US007801511B2

(12) United States Patent  (10) Patent No.:  US 7,801,511 B2
Zhu et al.  (45) Date of Patent:  Sep. 21, 2010

(54) MEDIA PLAYER CAPABLE OF BACKING UP DATA FROM A MOBILE PHONE AND PREVENTING OTHER PEOPLE FROM ACCESSING THE BACKED UPPED DATA

(75) Inventors: Jian-Guo Zhu, Shenzhen (CN); Tsung-Jen Chuang, Taipei Hsien (TW); Shih-Fang Wong, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 565 days.

(21) Appl. No.: 11/858,916

(22) Filed: Sep. 21, 2007

(65) Prior Publication Data

US 2008/0076390 A1  Mar. 27, 2008

(30) Foreign Application Priority Data

Sep. 22, 2006  (CN)  .................. 2006 1 0062735

(51) Int. Cl.
*H04M 3/16*  (2006.01)
(52) U.S. Cl. .................... 455/411; 455/550.1; 455/418; 455/466; 370/142.06
(58) Field of Classification Search .................. 455/411, 455/550.1, 418, 466; 379/142.06
See application file for complete search history.

(56) References Cited

U.S. PATENT DOCUMENTS 7,643,012 B2 *  1/2010  Kim et al. .................... 345/173

| 2003/0002395 | A1 | 1/2003 | Chang et al. |
| 2005/0027385 | A1 | 2/2005 | Yueh |
| 2005/0177686 | A1 | 8/2005 | Yueh |
| 2005/0239450 | A1 * | 10/2005 | Wesby ......................... 455/418 |
| 2007/0004450 | A1 * | 1/2007 | Parikh ...................... 455/556.1 |
| 2007/0165806 | A1 * | 7/2007 | Bocking et al. ......... 379/142.01 |
| 2007/0264982 | A1 * | 11/2007 | Nguyen et al. ........... 455/414.1 |
| 2008/0242322 | A1 * | 10/2008 | Scott et al. ................... 455/466 |

FOREIGN PATENT DOCUMENTS

TW  591415  6/2004
TW  I243599  11/2005

* cited by examiner

*Primary Examiner*—Danh C Le
(74) *Attorney, Agent, or Firm*—Frank R. Niranjan

(57) ABSTRACT

A media player is provided. The media player is not only capable of automatically backing up information from a mobile phone and deleting predetermined backupped information from the mobile phone, but is also capable of preventing others accessing the backupped information. The media player includes a memory, a communication unit, a signal processing module, and a user identification module. The memory stores a contact list and short messages. The communication unit is configured for communicating with a paired communication unit of a mobile phone. The signal processing module is configured for processing signals generated from the paired communication unit. The user identification module is configured for granting or denying access to the contact list and the short messages stored in the memory, depending on whether an inputted password matches a predetermined password or not.

7 Claims, 3 Drawing Sheets

MEDIA PLAYER CAPABLE OF BACKING UP DATA FROM A MOBILE PHONE AND PREVENTING OTHER PEOPLE FROM ACCESSING THE BACKED UPPED DATA

BACKGROUND

1. Technical Field

The present invention relates to media players, and particularly to a media player capable of backing up data from a mobile phone and preventing other people from accessing the backed upped data.

2. General Background

People commonly use hand-held computing devices today for various personal purposes. For example, an MP3 player is one hand-held device that is widely used to enjoy music. MP3 and other media players generally have a large memory capacity. However, this storage capacity is commonly utilized to store multimedia files.

Another hand-held device, e.g., mobile phone, is also widely used as a common communication tool for many people. The mobile phone includes an electronic phone book function that allows a user to store phone numbers of contacts, electronically on the mobile phone, so that the phone numbers can be accessed and dialed automatically without requiring the user to remember the numbers. Further, the mobile phone includes a short message function, which allows the user to view and send short messages. Such short messages as well as the phone numbers can be stored in a memory of the mobile phone. However, the storage capacity available is limited. That is, an amount of the phone numbers and short messages stored has a limit. When the amount reaches the limit, the mobile phone outputs a message notifying the user that the storage capacity is full and a new phone number or a new short message can be inserted into the memory by overwriting an existing phone number or existing short message. To a user who frequently uses the short message function, it is irritating and time consuming for the user to frequently delete the existing short messages so as to receive or send a new short message. For the user with a long list of telephone numbers, the user may not be able to store all the telephone numbers in the mobile phone. In addition, once the mobile phone is lost, valuable information (e.g., telephone numbers) is also lost and may not be recoverable.

What is needed, therefore, is a media player that can automatically backup valuable information (e.g., telephone numbers, short messages) from a mobile phone and delete the backed upped information (e.g., short messages) from the mobile phone, thereby not only efficiently utilizing the considerable storage capacity, but also overcoming the aforementioned problems of the mobile phone raised due to the limited storage capacity thereof and the loss of the mobile phone. The media player is also capable of preventing other people to access the backupped information so as to protect owner's privacy.

SUMMARY

A media player is provided. The media player is not only capable of automatically backing up information from a mobile phone and deleting predetermined backed upped information from the mobile phone, but is also capable of preventing other people to access the backupped information. The media player includes a nonvolatile memory, a communication unit, and a processing unit. The memory is configured for storing a contact list and short messages. The communication unit is configured for communicating with a paired communication unit of a mobile phone. The processing unit includes a signal processing module and a user identification module. The signal processing module is configured for processing signals generated from the paired communication unit of the mobile phone. The user identification module is configured for denying or allowing access to the contact list and the short messages based on an incorrect or correct password, respectively.

Other advantages and novel features will be drawn from the following detailed description with reference to the attached drawing.

DETAILED DESCRIPTION OF THE EMBODIMENT

Figure 1:
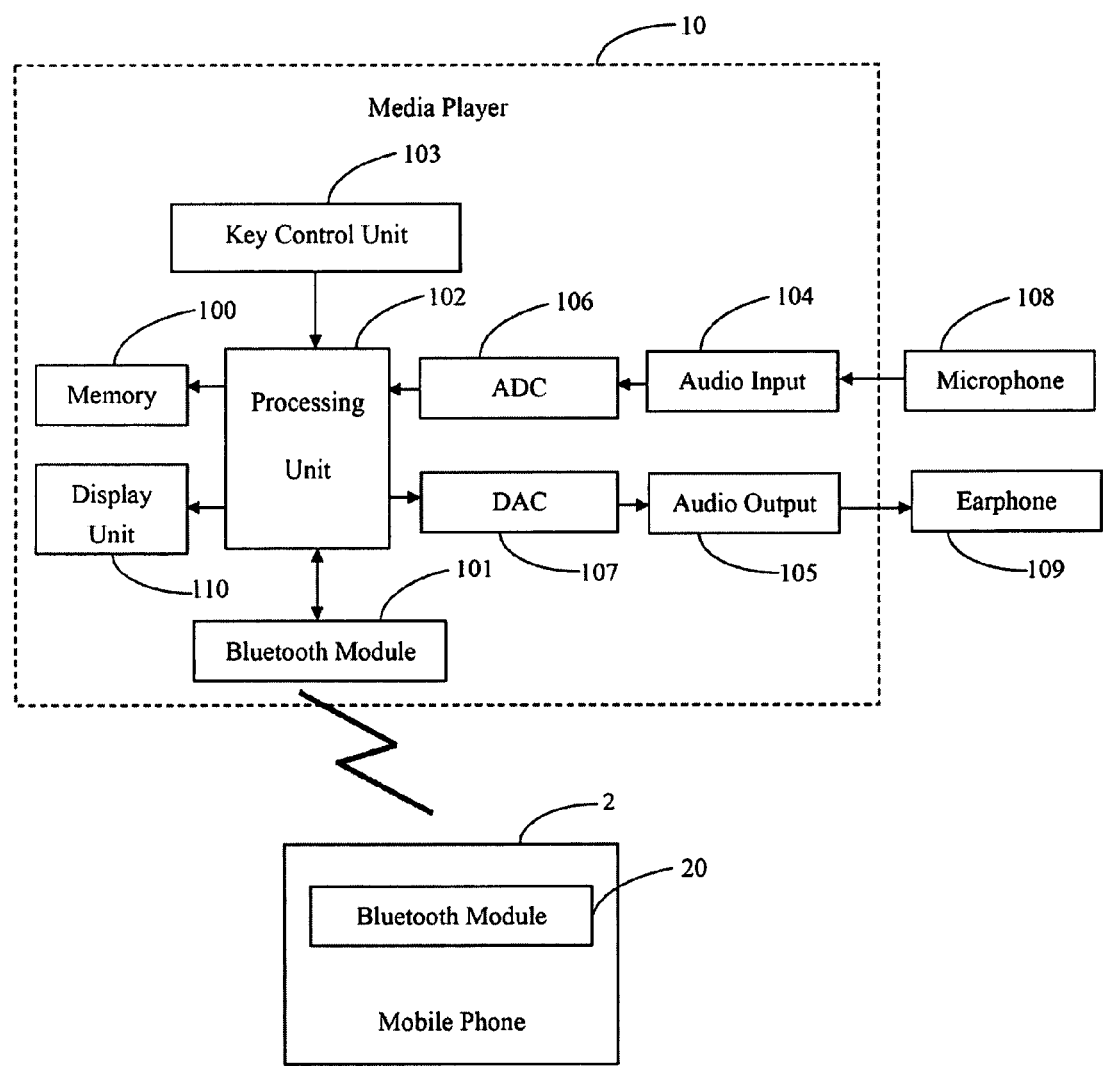
FIG. 1 is a schematic diagram of hardware infrastructure of a media player, which communicates with a mobile phone.

FIG. 1 is a schematic diagram of hardware infrastructure of a media player in accordance with a preferred embodiment of the present invention. The media player 10 includes a nonvolatile memory 100, a key control unit 103, an audio input 104, an audio output 105, an analog-to-digital converter (ADC) 106, a digital-to-analog converter (DAC) 107, and a display unit 110. These components perform similar functions as corresponding components of existing media players (e.g., MP3 players), thus, detailed descriptions of these components are omitted.

The media player 10 further includes a communication unit 101 and a processing unit 102. The communication unit (e.g., a Bluetooth module) 101 is configured for communicating with another paired Bluetooth external communication device (e.g., mobile phone) 2. The paired mobile phone 2 is shown with a Bluetooth communication unit 20 (e.g., a Bluetooth module) that communicates with the communication unit 101.

Figure 3:
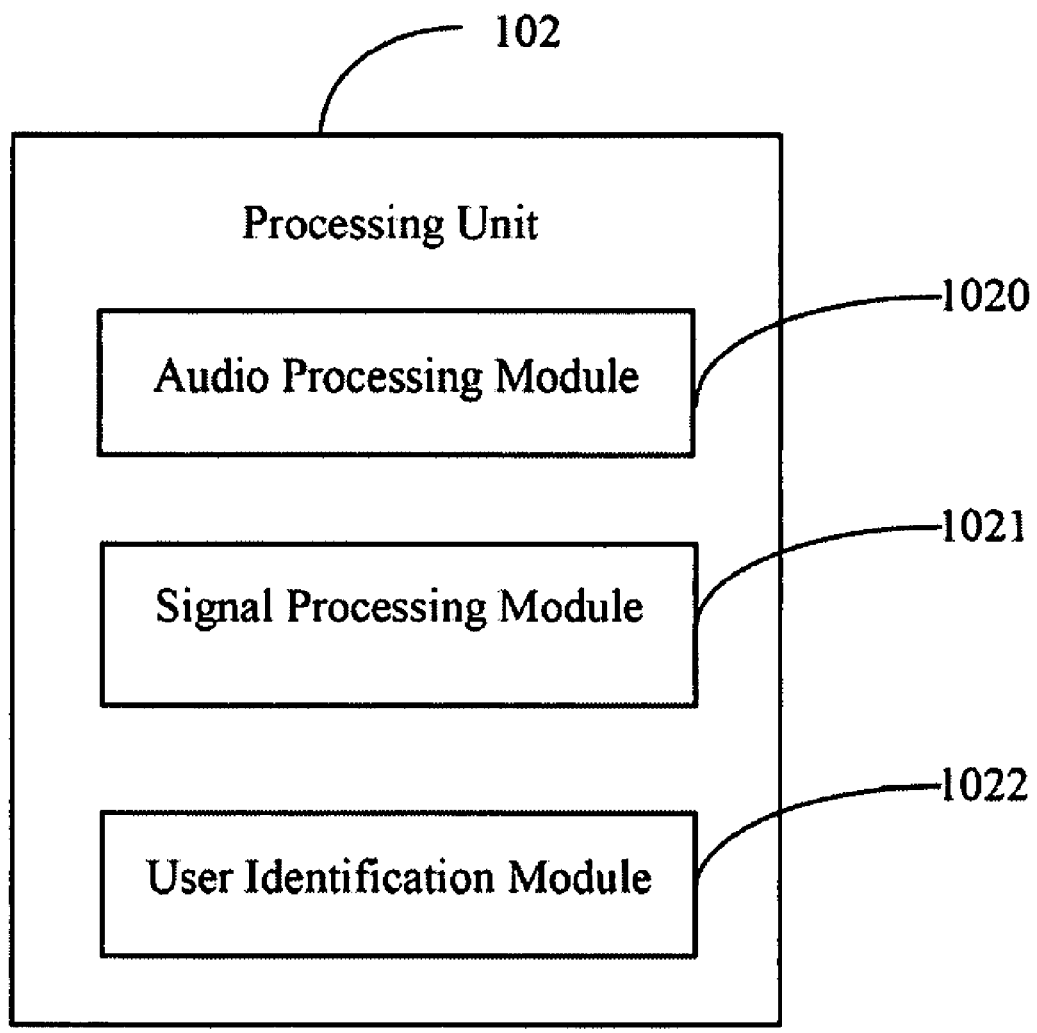
FIG. 3 is a schematic diagram of main function modules of a processing unit of the media player of FIG. 1.

The processing unit 102, as shown in FIG. 3, includes an audio processing module 1020, a signal processing module 1021, and a user identification module 1022.

The audio processing module 1020 is configured for processing audio files stored in the memory 100 and for generating corresponding audio signals.

The signal processing module 1021 is configured for processing signals generated from the paired mobile phone 2. When the Bluetooth module 101 receives a short message transmitted from the Bluetooth module 20 of the paired mobile phone 2, the signal processing module 1021 stores the short message in the memory 100, and sends a delete signal to the paired mobile phone 2 to delete the short message from the paired mobile phone 2, thus to avoid manually deletion of short messages on the mobile phone 2. This will free up memory in the paired mobile phone 2.

The memory 100 further stores telephone numbers, some of which are designated as target telephone numbers. Short messages from telephone numbers that match the target telephone numbers are regarded as important messages and are to be stored in the memory 100. Accordingly, when the Bluetooth module 101 receives a short message transmitted from the Bluetooth module 20 of the paired mobile phone 2, the signal processing module 1021 determines whether the received short message matches a target telephone number. If so, the signal processing module 1021 stores the important message in the memory 100, and sends the delete signal to the paired mobile phone 2 to delete the corresponding message from the paired mobile phone 2. Otherwise, the signal processing module 1021 temporarily stores the important message in a cache (not shown).

The signal processing module 1021 further periodically sends a copy signal to the paired mobile phone 2, so as to invoke the paired mobile phone 2 to read a contact list and to send a copy of the contact list to the media player 10. The Bluetooth module 101 receives the copy of the contact list sent from the paired mobile phone 2, and stores the copy of the contact list in the memory 100, thereby obtaining a backup of the contact list of the paired mobile phone 2.

Figure 2:
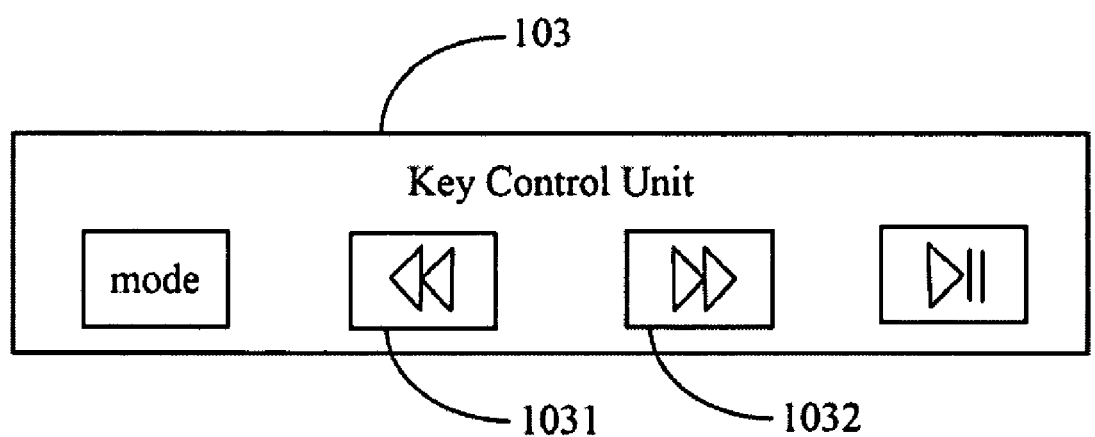
FIG. 2 is a schematic diagram showing a key control unit of the media player of FIG. 1.

In addition, when the Bluetooth module 101 receives an incoming call (namely when the paired mobile phone 2 receives the incoming call) and the processing unit 102 receives an answer signal generated by a key of the key control unit 103 (e.g., a key 1031 of FIG. 2), the signal processing module 1020 establishes a communication connection with a corresponding incoming caller. Accordingly, the user of the media player 10 can perform the communication connection with the incoming caller with accessories of the media player 10, e.g., a microphone 108 and an earphone 109, without having to directly hold the paired mobile phone 2 near the user's head, thereby reducing radiation injury of the mobile phone 2 toward the head.

Contrarily, when the processing unit 102 receives a reject signal generated by a key of the key control unit 103 (e.g., a key 1032 of FIG. 2), the signal processing module 1020 rejects the communication connection with the incoming caller.

The user identification module 1022 is configured for identifying a user and thus to grant a user's access. The user identification module 1022 provides a password verification interface for receiving a password entered by a person. The person can enter the password by pressing keys of the key control unit 103 in a predetermined order.

When the entered password is a predetermined password, the user identification module 1022 regards the person as a legitimate user/owner of the media player 10 and allows the owner access to the contact list or short messages stored in the memory 100. The predetermined password is pre-set by the owner of the media player 10 through the password verification interface. That is, the owner of the media player 10 enters the predetermined password by pressing keys of the key control unit 103 in a predetermined order.

When the password entered is incorrect, the user identification module 1022 denies access to the contact list or the short messages stored in the memory 100, thereby preventing important or sensitive information from theft. The user identification module 1022 further prompts an incorrect password message when the entered password is not the predetermined password.

Applying the backup and the password verification mechanism of the media player 10, the owner of the media player 10 and the paired mobile phone 2, does not need to worry about the mobile phone's information been lost or damaged. Furthermore, applying the communication mechanism, the owner can directly answer the incoming call by holding the media player 10 instead of holding the paired mobile phone 2, thereby reducing the radiation injury of the mobile phone 2.

Although the present invention has been specifically described on the basis of a preferred embodiment thereof, the invention is not to be construed as being limited thereto. Various changes or modifications may be made to the embodiment without departing from the scope and spirit of the invention.

What is claimed is:

1. A media player comprising:
   a non-volatile memory, configured for storing a contact list and short messages;
   a communication unit, configured for communicating with a paired communication unit of a mobile phone; and
   a processing unit comprising:
   a signal processing module, configured for processing signals generated from the paired communication unit of the mobile phone; and
   a user identification module, configured for denying access to the contact list and the short messages stored in the memory when an inputted password does not match a predetermined password and for granting access to the contact list and the short message stored in the memory when the inputted password matches the predetermined password.

2. The media player according to claim 1, wherein the signals comprises short messages, when the signal processing module receives and stores the short messages in the memory, the signal processing module further sends a signal to the mobile phone communicated therewith to delete the short messages from the mobile phone.

3. The media player according to claim 1, wherein the received and stored short messages are short messages from predetermined telephone numbers.

4. The media player according to claim 1, wherein the signal processing module periodically obtains a copy of the contact list from the mobile phone communicated therewith through the paired communication unit thereof, and stores the copy of the contact list in the non-volatile memory.

5. The media player according to claim 1, further comprising a key control unit having a plurality of keys for generating commands in response to operation thereon, wherein one of the keys is configured for performing a communication operation, wherein when the mobile phone receives a call and the processing unit receives the command generated from the key for performing a communication operation, the signal processing module establishes a communication connection with a caller.

6. The media player according to claim 1, wherein the communication unit is a Bluetooth communication unit.

7. The media player according to claim 1, wherein the memory further stores audio files, and the processing unit further comprises an audio processing module for processing the audio files and generating corresponding audio signals.

* * * * *